United States Patent [19]
Schäfer

[11] Patent Number: 5,920,800
[45] Date of Patent: Jul. 6, 1999

[54] BROADBAND DISTRIBUTION SYSTEM AND METHOD THEREFOR

[75] Inventor: Johann-Peter Schäfer, Sachsenheim, Germany

[73] Assignee: Alcatel N.V., Rijswijk, Netherlands

[21] Appl. No.: 08/617,297

[22] Filed: Mar. 18, 1996

[30] Foreign Application Priority Data

Mar. 28, 1995 [DE] Germany ............ 195 11 332

[51] Int. Cl.$^6$ ............................................. H04N 7/173
[52] U.S. Cl. ..................... 455/3.1; 348/12; 348/13; 348/7; 348/10; 455/5.1; 455/4.2; 455/6.2; 455/6.3
[58] Field of Search .................. 348/12, 13, 7, 348/10, 6, 8; 455/3.1, 5.1, 4.2, 6.2, 6.3; 370/442; H04N 7/173

[56] References Cited

U.S. PATENT DOCUMENTS

| | | | |
|---|---|---|---|
| 4,199,661 | 4/1980 | White et al. | 370/91 |
| 4,430,731 | 2/1984 | Gimple et al. | 455/5.1 |
| 4,484,328 | 11/1984 | Schlafly | 348/12 |
| 4,538,174 | 8/1985 | Gargini et al. | 348/7 |
| 4,689,619 | 8/1987 | O'Brien, Jr. | 348/12 |
| 4,813,037 | 3/1989 | Debuysscher et al. . | |
| 5,027,351 | 6/1991 | De Prycker et al. . | |
| 5,107,361 | 4/1992 | Kneidinger et al. . | |
| 5,128,790 | 7/1992 | Heidemann et al. . | |
| 5,162,937 | 11/1992 | Heidemann et al. . | |
| 5,172,374 | 12/1992 | De Cristofaris . | |
| 5,181,106 | 1/1993 | Sutherland . | |
| 5,202,780 | 4/1993 | Fussgänger . | |
| 5,214,638 | 5/1993 | Norz et al. . | |
| 5,303,229 | 4/1994 | Withers et al. . | |
| 5,337,175 | 8/1994 | Ohnsorge et al. . | |
| 5,353,285 | 10/1994 | Van Der Plas . | |
| 5,446,918 | 8/1995 | Lamy | 348/12 |
| 5,481,542 | 1/1996 | Logston et al. | 370/94.2 |
| 5,481,757 | 1/1996 | Mihara et al. | 455/5.1 |

(List continued on next page.)

FOREIGN PATENT DOCUMENTS

| | | |
|---|---|---|
| 0245077 | 11/1987 | European Pat. Off. . |
| 0333466 | 9/1989 | European Pat. Off. . |
| 0045066 | 2/1992 | European Pat. Off. . |
| 3439399 | 4/1986 | Germany . |
| 08037657 | 2/1996 | Japan . |

OTHER PUBLICATIONS

"On implementing computer networking on existing cable TV plants: Some interesting proposals", A. Karshmer et al, *Microprocessing and Microprogramming*, 40 (1994) Jun., No. 5, Amsterdam, NL, pp. 355–373.

"Zugangnetzstrukturen fur interaktive Videodienste (Teil 1)", H. Hessenmuller et al, *Der Fernmelde Ingenieur*, Verlag fur Wissenschaft und Leben Georg Heidecker GmbH, 8.94, pp. 5–10, 22–25, 29–30.

"A Fiber in the Loop Cable TV System using Analog Optical Transmission with Optical Amplifiers", W. Schmid et al, *Electrical Communication*, 3rd Quarter 1993, pp. 248–259.

*Primary Examiner*—John K. Peng
*Assistant Examiner*—Linus H. Lo
*Attorney, Agent, or Firm*—Milton Oliver; Ware, Fressola, Van Der Sluys & Adolphson

[57] ABSTRACT

In a broadband distribution system (SYS) for distributing television signals (TVS) and video signals (VOD), the return channel provided for requesting video signals is divided among the subscribers (TN) of the broadband distribution system (SYS) in such a way, that each group of subscribers (TN) is assigned a part of the return channel using time-division multiplexing, and the individual subscribers (TN) of a group have equal access to the part of the return channel assigned to the respective group. Access by the individual subscribers (TN) is monitored by a control unit (CONTROL) in the center (ZE) of the broadband distribution system (SYS). To synchronize the signals transmitted by the subscribers (TN) over the return channel using time-division multiplexing, the center (ZE) has a synchronizer (SYNC) which compensates for phase differences produced by differences in transit time.

12 Claims, 6 Drawing Sheets

U.S. PATENT DOCUMENTS

| | | | |
|---|---|---|---|
| 5,487,035 | 1/1996 | Nishimura et al. | 348/7 |
| 5,499,047 | 3/1996 | Terry et al. | 348/12 |
| 5,512,936 | 4/1996 | Burton et al. | |
| 5,534,913 | 7/1996 | Majeti et al. | 348/12 |
| 5,546,119 | 8/1996 | Bestler et al. | 455/5.1 |
| 5,553,064 | 9/1996 | Paff et al. | 348/10 |
| 5,572,347 | 11/1996 | Burton et al. | |
| 5,572,517 | 11/1996 | Safadi | 348/13 |
| 5,586,121 | 12/1996 | Moura et al. | 348/12 |
| 5,608,448 | 3/1997 | Smoral et al. | 348/13 |

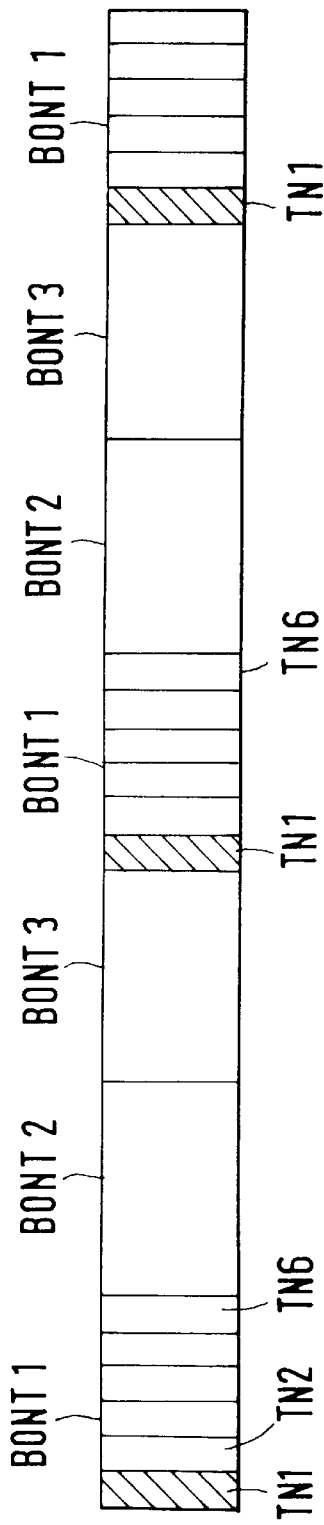
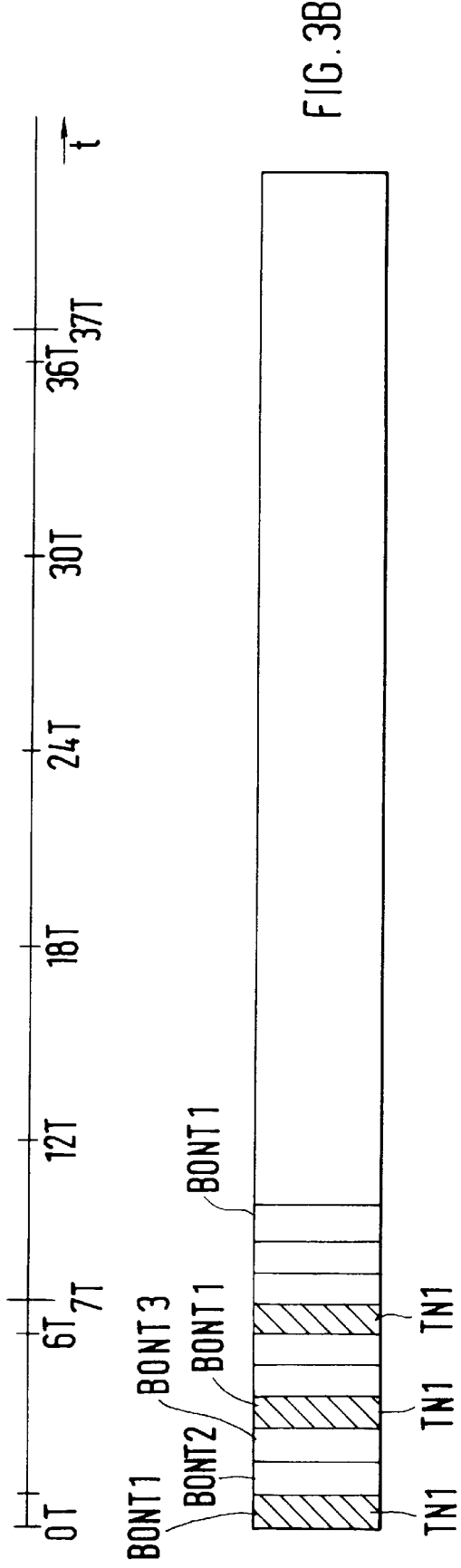

BROADBAND DISTRIBUTION SYSTEM AND METHOD THEREFOR

TECHNICAL FIELD

The invention concerns a broadband distribution system, a method and a center therefor.

BACKGROUND OF THE INVENTION

Broadband distribution networks as such are known e.g. from the 8/1994 brochure "The Telecommunications Engineer", pages 5–10, 22–25 and 29–30, Heidecker Publications. A broadband distribution network is described which, in addition to different kinds of unidirectional TV-services, also provides bidirectional, interactive video services. Subscribers receive television and video signals over a downstream channel, and are able to request their subscriber-specific video signal from the server over a return channel. The concept of access to the return channel is e.g. in two steps. The first step uses an access method with central control. The individual subscribers of a network segment are e.g. assigned time slots using time-division multiplexing for the transmission of the subscriber-specific information. In a second step, the network segments are combined in cell-structure form and are transmitted with an individual node address to the server. In this way the return channel is divided into subscriber-specific channels. This has the disadvantage e.g. of a low transmission rate per subscriber.

DISCLOSURE OF INVENTION

It is therefore the task of the invention to provide a broadband distribution system which gives the subscribers more flexible access to the return channel.

According to a first aspect of the present invention, a broadband distribution system for distributing television and video signals, comprising a center, a plurality of broadband network terminations, and a plurality of subscribers, wherein the broadband network terminations are connected to the center, wherein separate groups of subscribers are connected to each broadband network termination, wherein television and video signals are transmittable from the center to the plurality of subscribers over downstream channels, and wherein request signals are transmittable from the plurality of subscribers to the center over a return channel, is characterized in that the return channel is divisible among groups of subscribers using time-division multiplexing, that the individual subscriber of a respective group have equal access to a part of the return channel assigned to the respective group, that simultaneous transmission of request signals by different subscribers of a group is detectable via a control unit, and that forwarding of said request signals by the control unit can be inhibited.

According to a second aspect of the present invention, a method of transmitting request signals from subscribers to a center of a broadband distribution system for transmitting television and video signals, wherein the request signals are transmitted in a return channel of the broadband distribution system, and wherein the television and video signals are transmitted in a downstream channel of the broadband distribution system, is characterized in that the return channel is divided among groups of subscribers using time-division multiplexing, that the individual subscribers of a respective group have equal access to a part of the return channel assigned to the respective group, that simultaneous transmission of request signals by different subscribers of a group is detected via a control unit, and that forwarding of said request signals by the control unit is inhibited.

According to a third aspect of the present invention a center of a broadband distribution system for transmitting television and video signals over a downstream channel, and for receiving request signals over a return channel, is characterized in that the center has at least one control unit, that the return channel is divisible among groups using time-division multiplexing, and that each control unit is able to receive request signals from a group of subscribers and to detect a transmission of request signals in the same time slot from different subscribers (TN) in a group and is able to inhibit forwarding of said request signals in a same time slot.

A particular advantage of the invention is faster access to the return channel by the subscribers, on a statistical average. Another advantage of the invention is the lower total circuitry required to construct the first step. Furthermore, due to the use of a collision monitoring method, the flexibility of adding further subscribers is an advantage.

These and other objects, features and advantages of the present invention will become more apparent in light of the detailed description of a best mode embodiment thereof, as illustrated in the accompanying drawing.

BEST MODE FOR CARRYING OUT THE INVENTION

A configuration example of the invention will now be described by means of FIGS. 1 to 6.

Figure 1:
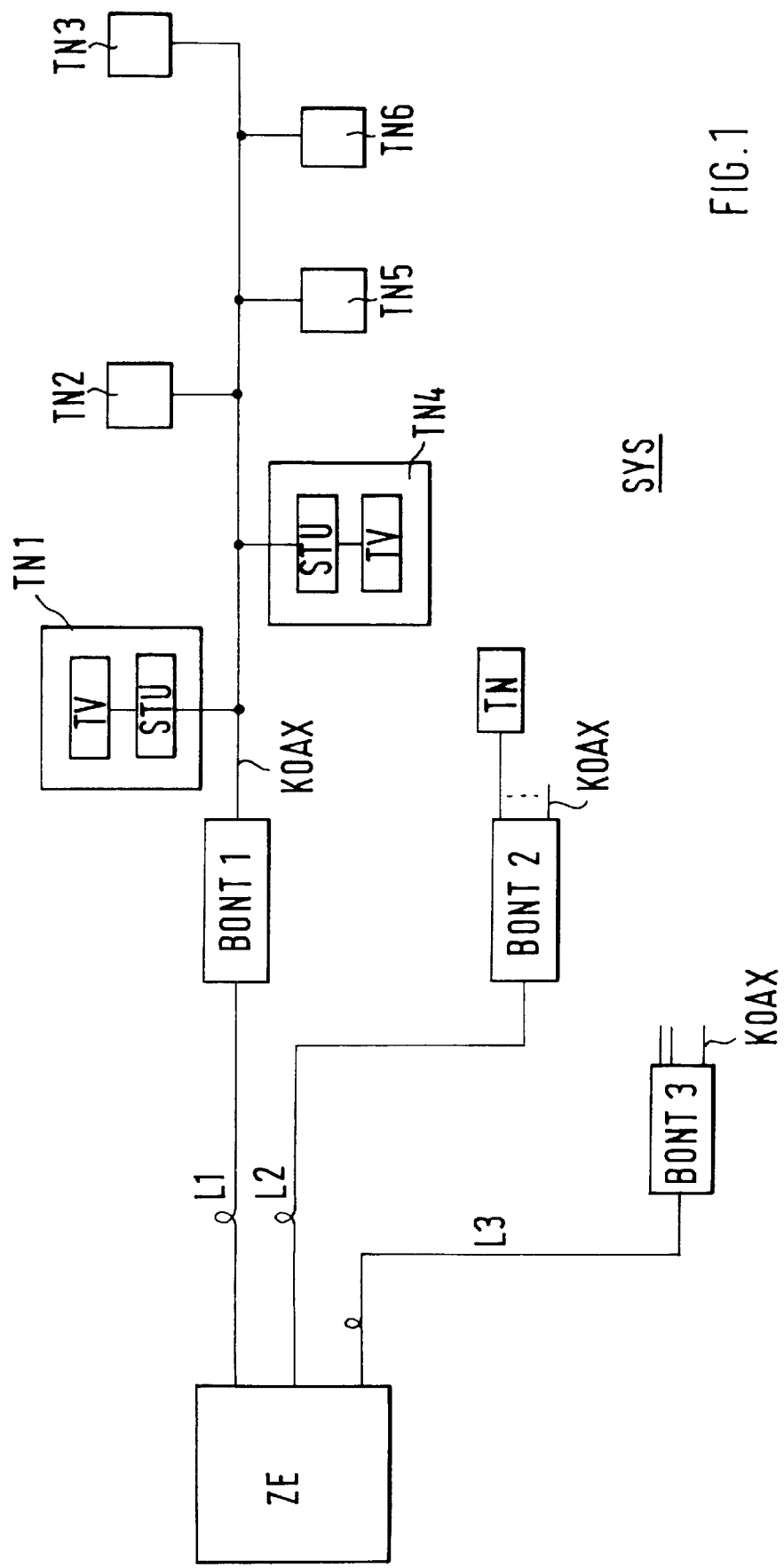
FIG. 1 is a schematic illustration of a configuration example of the invention's broadband distribution system.

FIG. 1 illustrates a broadband distribution system according to the invention. The broadband distribution system SYS has a center ZE, three broadband network terminations BONT1, BONT2, BONT3, and several subscribers TN1 to TN6. Each of the broadband network terminations BONT1 to BONT3 is connected with the center ZE by optical glass fiber lines L1, L2, L3. The first broadband network termination BONT1 is connected to six subscribers TN1 to TN6 by an electric coaxial line KOAX. The broadband network terminations BONT2 and BONT3 are connected to different subscribers TN by separate electric coaxial lines KOAX. Each subscriber TN, TN1 to TN6 has a television receiver TV and a set-top converter STU. The television receiver TV is connected to the electric coaxial line KOAX through the set-top converter STU.

The center ZE may be used to distribute television, radio and video signals. The signals transmitted from the center ZE to the broadband network terminations BONT1–BONT3 are transmitted via optical glass fiber lines L1, L2, L3. The optical glass fiber lines L1, L2, L3 have different lengths, which leads to transit time differences. A difference of 10 km in length creates a transit time difference of about 50 μs. An optical-electrical conversion takes place in the broadband network terminations BONT1 to BONT3. The signals transmitted by the broadband network terminations BONT1 to BONT3 are transmitted to several subscribers TN via one or more coaxial lines KOAX. The transmission of signals from the center ZE to the subscribers TN takes place over a downstream channel with a high data rate, in a frequency range of about 50 MHz to 630 MHz. The transmission of signals from the subscribers TN to the center ZE takes place over a return channel with a low data rate, in a frequency range of about 5 MHz to 45 MHz. Basically, each of the subscribers can receive all the signals transmitted by the center ZE. However, some signals, e.g. special television signals and the video signals, are encoded and can only be decoded by authorized subscribers TN.

Special video films, which are offered by the center ZE in a video film catalog, can e.g. be ordered by subscriber TN1 through the set-top converter STU over the return channel. The center ZE transmits the ordered video film in the form of video signals to all subscribers TN, with the exclusive authorization for decoding by subscriber TN1. Only subscriber TN1 is authorized and able to decode the ordered video signals by means of the set-top converter STU.

Figure 2:
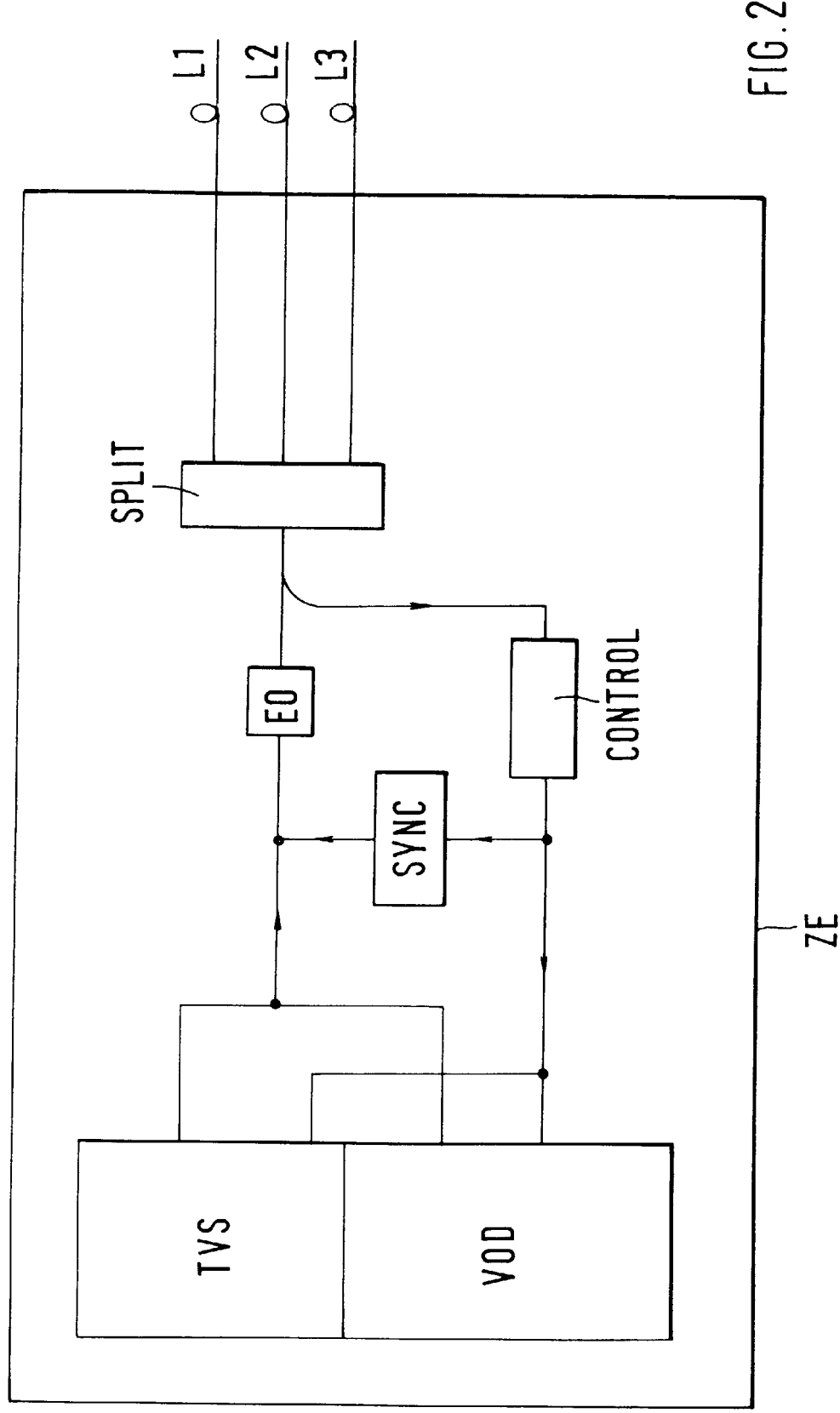
FIG. 2 is a schematic illustration of the construction of a center in the invention's broadband distribution system in FIG. 1, FIGS. 3A and 3B are two schematic illustrations on a common timeline of the return channel division.

FIG. 2 depicts the schematic assembly of the center in FIG. 1. The center ZE comprises a television and radio server TVS, a video-on-demand server VOD, an electrical-optical converter EO, and an optical beam splitter SPLIT.

The television and radio server TVS and the video-on-demand server VOD are used to distribute radio, television and video signals. The individual signals are superimposed and routed through the electrical-optical converter EO to the optical beam splitter SPLIT, from where they are transmitted to the broadband network terminations BONT1 to BONT3 and to the subscribers TN.

The signals that can be received by the center ZE via the optical glass fiber lines L1, L2, L3, namely e.g. request signals from subscribers TN for special video signals, are supplied to the control unit CONTROL after they pass through the optical beam splitter SPLIT, from which they are transmitted on the one hand to the television and radio servers TVS, as well as to the video-on-demand server VOD, and on the other hand to the synchronizer SYNC.

In addition, the synchronizer SYNC is connected to the electrical connection of the electrical-optical converter EO. The synchronizer SYNC is used to synchronize the request signals transmitted by the broadband network terminations BONT1 to BONT3, for the time-division multiplexed return channel. Time slots are assigned on a time-division multiplex basis to the broadband network terminations BONT1 to BONT3 connected to the center ZE. Each broadband network termination BONT1 to BONT3 is connected to several subscribers TN, who have equal access to the time slot assigned to the respective broadband network termination. The subscribers TN connected to a broadband network termination form a group of subscribers TN. The simultaneous transmission of request signals from different subscribers TN of a group causes so-called collisions, which are irreversible superimpositions of signals. If collisions occur, the request signals cannot be evaluated. The control unit CONTROL monitors the occurrence of collisions. Collisions are detected e.g. by a threshold detector, which emits an alarm signal if the amplitude of the monitored signal exceeds a predetermined threshold value. If the control unit CONTROL detects the occurrence of a collision, forwarding the request signals is inhibited and all subscribers TN of a group in which the collision has occurred, receive a return message about the occurrence of a collision, over the downstream channel. To identify the group, the return message contains an indication of the broadband network termination BONT which is connected to the group. Only the broadband network termination BONT indicated in the return message is able to evaluate the return message. This guarantees accurate addressing. The subscribers TN of the group receiving the return message repeat their transmission after a period of time determined by a random-check generator. The random-check generator is located in the set-top converter. If no collision takes place, the request signals from subscribers TN are forwarded by the control unit CONTROL to the television and radio server TVS, and/or to the video-on-demand server VOD.

FIGS. 3A and 3B are two schematic illustrations on a common timeline of the return channel divided by time-division multiplexing. FIG. 3A illustrates division of the return channel into subscriber-specific channels according to the prior art for a broadband distribution system with a center, three broadband network terminations BONT1, BONT2, BONT3 and six subscribers TN1 to TN6 per broadband network termination BONT. Each subscriber TN is assigned a time slot with the duration T. The subscribers TN of a broadband network termination BONT are serviced sequentially in time. Each broadband network termination BONT is assigned a time slot with the duration 6T. The individual broadband network terminations BONT are operated sequentially in time. If the first subscriber TN1 of the first broadband network termination BONT1 wishes to transmit request signals to the center, and needs a time period of 3T e.g., a total time of 37T is required for the transmission of the request signals, because of the return channel division.

FIG. 3B illustrates a division of the return channel for the broadband distribution system SYS of the invention, with three broadband network terminations BONT1 to BONT3 and six subscribers TN1 to TN6 per broadband network termination BONT. Each broadband network termination BONT is assigned a time slot with the duration T. The individual broadband network terminations BONT operate sequentially in time. The six subscribers TN1 to TN6 of a broadband network termination BONT have equal access to the time slot assigned to the respective broadband network termination BONT.

If the first subscriber TN1 of the first broadband network termination BONT wishes to transmit request signals to the center, and needs a time period of 3T e.g., a total time of 7T is required, because of the return channel division for the transmission of the request signals, and under the assumption that the subscribers TN2 to TN6 do not transmit during the transmission of the request signals by subscriber TN1. A total time of 7T instead of the 37T from the comparison example of FIG. 3A means a considerable increase in the transmission speed. With a low load of the return channel, which must be assumed since the subscribers will normally again transmit request signals, whose duration is in the seconds range, not earlier than 90 min after the end of the ordered video film, a considerable increase in transmission speed can be achieved, even with the occurrence of collisions.

Figure 4:
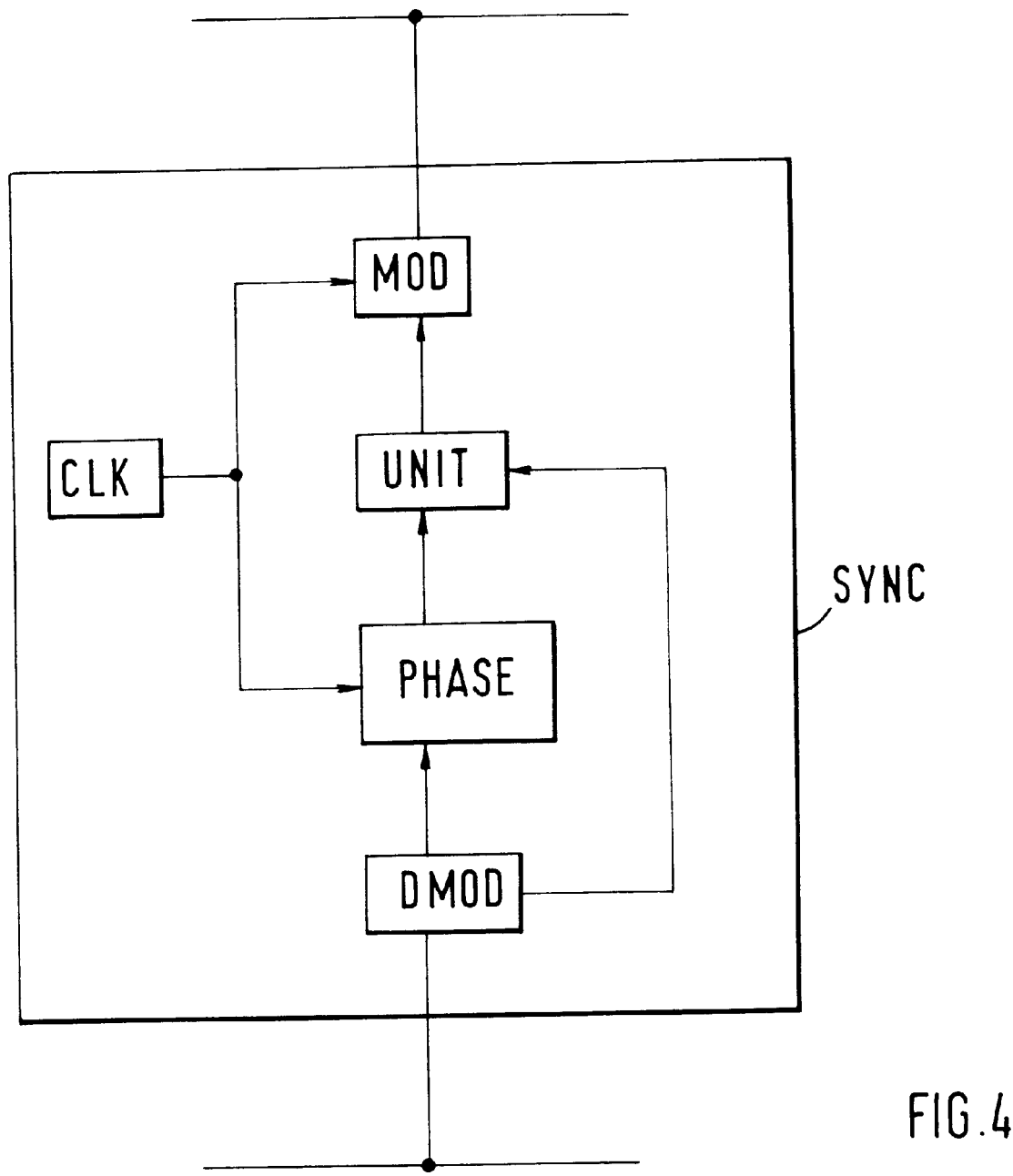
FIG. 4 is a schematic illustration of the construction of a synchronizing device in the invention's broadband distribution system in FIG. 1.

FIG. 4 illustrates the schematic construction of the synchronizer in FIG. 1.

The synchronizer SYNC comprises a clock generator CLK, a modulator MOD, a demodulator DMOD, a phase comparator PHASE and a controller UNIT. The controller UNIT is a microprocessor, for example.

The clock generator CLK produces a synchronization signal. The synchronization signal is a clock signal with the cycle duration D and the pulse duration I. The cycle duration D depends on the number of broadband network terminations BONT connected to the center. Each broadband network termination BONT is assigned a time slot of pulse duration I, for example. The time slots are assigned sequentially in time to the broadband network terminations BONT; there is always a pause P between the time slots. With n broadband network terminations BONT, the cycle duration $D=n*(I+P)$. The pulse duration is e.g. $I=100 \mu s$, the pause is e.g. $P=6 \mu s$, the number n of the broadband network terminations BONT is e.g. $n=3$. The result is a cycle duration $D=318 \mu s$. The synchronization signal is transmitted to the broadband network terminations BONT through the modulator MOD in the downstream channel of the broadband distribution system SYS. After receiving the synchronization signal, the individual broadband network terminations BONT always send a return signal, which is received by the demodulator DMOD in the synchronizer SYNC, where it is demodulated and supplied to the phase comparator PHASE. The phase comparator PHASE compares the phase of the synchronization signal with the phase of the return signal, and forwards the phase difference to the controller UNIT.

Figure 5:
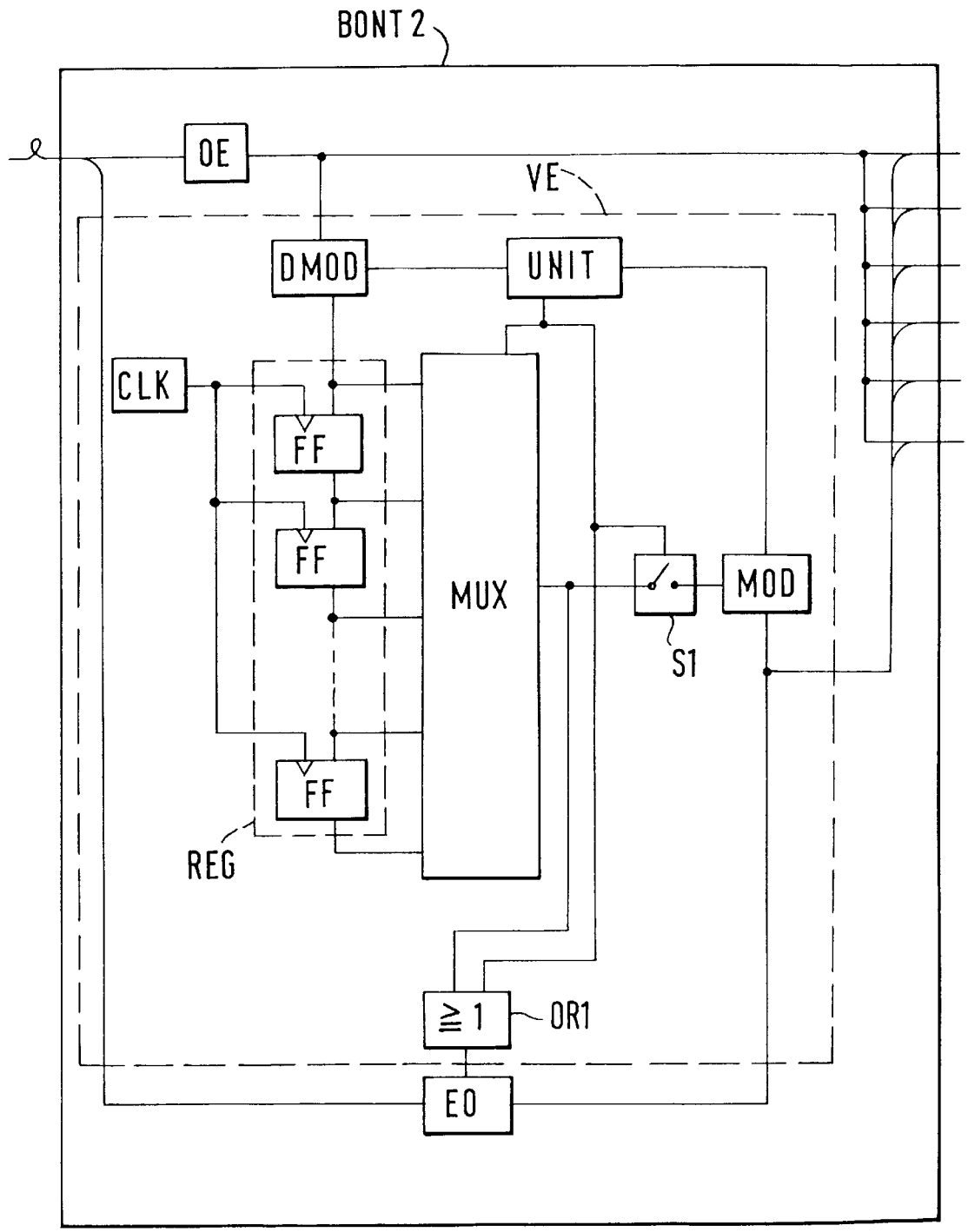
FIG. 5 is a schematic illustration of a broadband network termination in FIG. 1.
Figure 6:
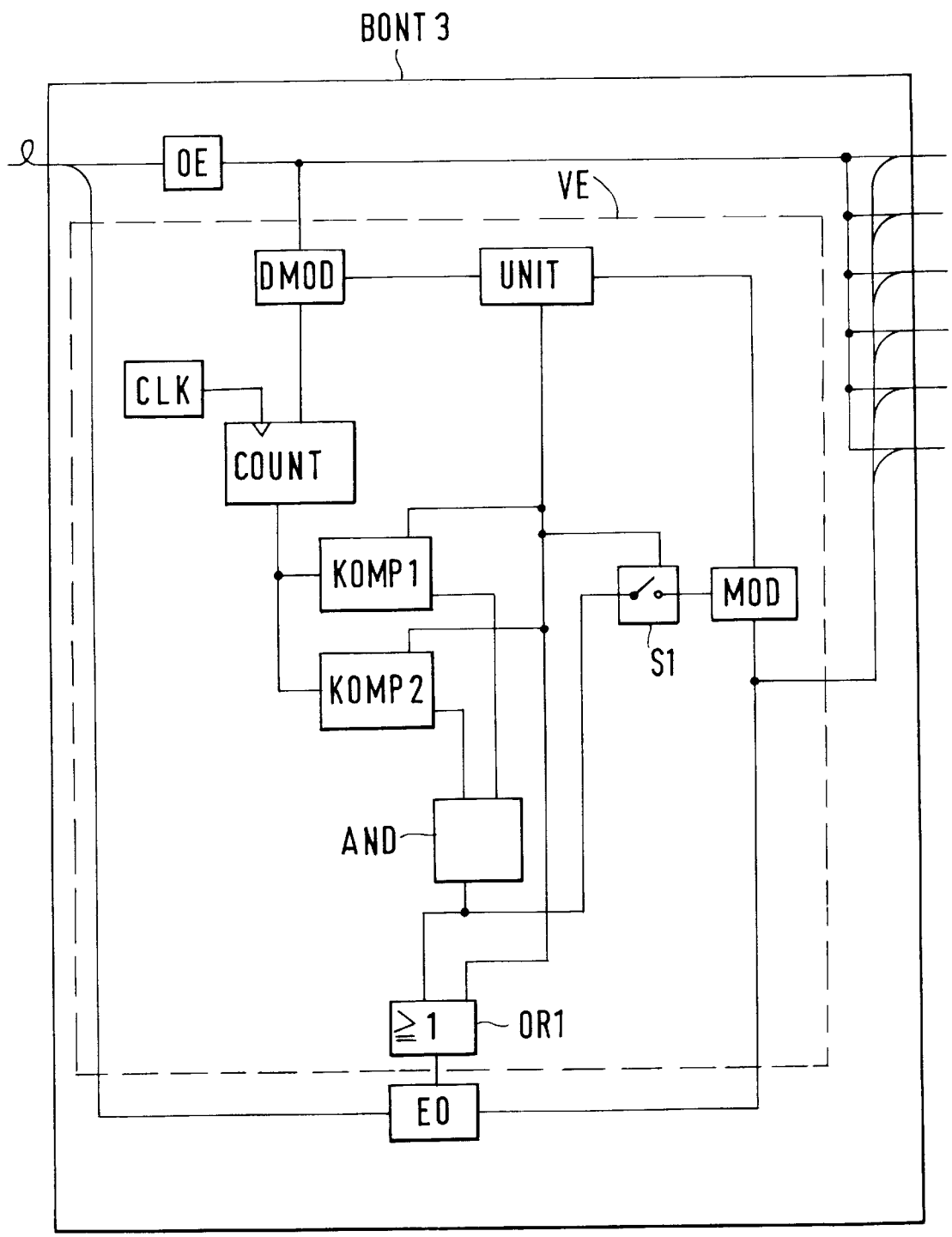
FIG. 6 is a schematic illustration of another broadband network termination in FIG. 1.

From the phase differences between the return signals of the broadband network terminations BONT and the synchronization signal, the controller UNIT determines control signals for the delay device of the broadband network terminations BONT (see FIGS. 5 and 6).

The control signals are transmitted to the broadband network terminations BONT via the modulator MOD in the downstream channel. In addition to the return signals, the broadband network terminations BONT transmit status signals to the synchronizer SYNC. The status signals are supplied to the demodulator of the controller UNIT. The status signals, e.g., contain indications about the delay set in the delay devices of the broadband network terminations BONT.

FIG. 5 is a schematic representation of the broadband network termination BONT2 in FIG. 1. The broadband network termination BONT2 comprises a delay device VE, an optical-electrical converter OE and an electrical-optical converter EO. The broadband network termination BONT2 receives optical signals from the center ZE through an optical glass fiber line, converts these signals with the optical-electrical converter OE into electrical signals, and distributes the electrical signals to all subscribers connected to the broadband network termination BONT2. In addition, the broadband network termination BONT2 receives electrical signals from the subscribers through electric coaxial lines, converts these signals with the electrical-optical converter EO into optical signals, and transmits these optical signals to the center ZE. The received optical signals contain the synchronization signal and the control signals; the optical signals transmitted to the center ZE contain the return signals and the status signals. The delay device VE comprises a clock generator CLK, a controller UNIT, e.g. a microprocessor, several D-flip-flops FF, a multiplexer MUX, a switch S1, e.g. a transistor, an OR-gate, a modulator MOD and a demodulator DMOD.

The demodulator DMOD is connected to the electrical connector of the optical-electrical converter OE, the input of the first D-flip-flop FF and the controller UNIT. From the received and electrically converted signals, the demodulator DMOD demodulates the synchronization signal and the specific control signal for the broadband network termination BONT2, and routes the synchronization signal to the input of the first D-flip-flop FF, and the control signal to the controller UNIT.

The D-flip-flops FF are connected in series. The non-inverting output of the first D-flip-flop FF is connected to the input of the second D-flip-flop FF, etc. In this way the D-flip-flops FF form a shift register REG. All D-flip-flops FF are pulsed with a pulse generated by the clock generator. The cycle duration of the pulse is smaller by orders of magnitude than the cycle duration of the synchronization signal, e.g. by a factor of 100. The outputs of the D-flip-flops FF and the input of the first D-flip-flop FF are connected to the multiplexer MUX, which is controlled by the controller UNIT, whose output is connected to the switch S1 and to the first input of the OR-gate. The switch S1 is controlled by the controller UNIT and is also connected to the modulator MOD. The second input of the OR-gate is connected to the controller UNIT, and the output of the OR-gate is connected to the electrical-optical converter EO.

The following describes a synchronization process between a center ZE and several broadband network terminations BONT. Synchronization signals are transmitted from the center ZE to all broadband network terminations BONT connected to the center ZE. In addition, the center ZE transmits specific control signals sequentially in time for each broadband network termination BONT. The control signals request the respective broadband network termination BONT to transmit a return signal to the center ZE together with the synchronization signal. To that end, the controller UNIT in delay device VE adjusts the multiplexer MUX in the respective broadband network termination BONT for an average delay value, the switch S1 is closed and the electrical-optical converter EO is switched on for duration 'one' by switching on the OR-gate. The respective broadband network termination BONT transmits the synchronization signal, delayed by the glass fiber line and by the shift register REG, via the modulator MOD and the electrical-optical converter EO, in the form of a return signal to the center ZE. In addition, the position of the multiplexer MUX is transmitted to the center ZE in the form of status signals. A phase comparison between the synchronization signal and the respective return signal takes place in the phase comparator PHASE in the center ZE. From the result of the phase comparison, and the position of multiplexer MUX the controller UNIT of the center calculates a new position for the multiplexer MUX of the respective broadband network termination BONT, and this new position is transmitted to the respective broadband network termination BONT via control signals, to compensate for the phase difference between the synchronization signal and the return signal. The switch S1 is opened again after the synchronization has taken place. This achieves that signals, particularly request signals transmitted from different broadband network terminations BONT, are received in-phase at the center ZE. The synchronization process can be performed at the initialization and during the operation.

FIG. 6 is a schematic illustration of the broadband network termination BONT3 in FIG. 1.

The broadband network termination BONT3 and its function is similar to the broadband network termination BONT2 in FIG. 5, except for the shift register and the multiplexer, which have been replaced by a counter COUNT, two comparators KOMP1, KOMP2, and an AND-gate. The demodulator DMOD supplies the synchronization signal, which is routed to the reset input of counter COUNT. After every reset, the counter COUNT tallies in steps from a minimum value to a maximum value, e.g. by means of each rising slope of the pulse generated by clock generator CLK. The output of the counter COUNT is supplied to the input of comparator KOMP1 and to the input of comparator KOMP2. A comparison between the input signal and a first value specified by the controller UNIT takes place in comparator KOMP1. If the value of the input signal is greater than the first value, the output of comparator KOMP1 produces a logical 'one'. A comparison between the input signal and a second value specified by the controller UNIT takes place in comparator KOMP2. If the second value is greater than the input signal, the output of comparator KOMP2 produces a logical 'one'. The second value is always greater than the first value. The outputs of comparators KOMP1, KOMP2 are connected to the inputs of the AND-gate. The output of the AND-gate is connected to the first input of the OR-gate and switch S1. The output of the AND-gate only becomes a logical 'one' when the counter COUNT produces a value which is between the first value and the second value. This achieves a delay of the synchronization signal, which can be adjusted by the first and second values specified by the controller UNIT. An advantage of this software-controlled adjustment of the delay is that the duration of the time slots assigned to the broadband network terminations BONT is variable and can be adjusted in accordance with the extent of the traffic during operation.

In the configuration example, the control unit CONTROL in the center ZE is a separate package. Several control units, each located in a broadband network termination BONT, can be used instead of a control unit CONTROL in the center ZE. This has the advantage that collisions can be detected faster because there is no transit time through the optical glass fiber lines.

Furthermore, for reasons of clarity, the configuration example in the center ZE and in the broadband network terminations BONT depicts no amplifiers, no attenuators, no anti-distortion devices, etc. whose use, arrangement, advantages or even necessity are known to the professional e.g. from "Electrical Communication", the quarterly technical journal of assignee, 3rd. quarter 1993, pages 248 to 259.

The distribution of the time slots in the broadband network terminations BONT of the configuration example is only an example. With e.g. 100 subscribers for the broadband network termination BONT1, and e.g. 200 subscribers for the broadband network termination BONT2, a time slot duration T for the broadband network termination BONT1 and a time slot duration 2 T for the broadband network termination BONT2 are advantageous.

The broadband distribution system SYS in the configuration example comprises a center ZE with a television and radio server TVS, and a video-on-demand server VOD. The center can also be divided into a main center and several subcenters, which are separated e.g. 100 km from each other. The main center e.g. has a television and radio server TVS, which is connected to several subcenters and supplies television and radio signals to all subscribers TN of the broadband distribution system SYS. Each of the subcenters e.g. has a video-on-demand server VOD with a control unit CONTROL for supplying video signals to a group of subscribers TN, and for monitoring access to a return channel by the subscribers TN of the group. This has the advantage that several servers are able to react to regionally different subscriber wishes.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A broadband distribution system (SYS) for distributing television and video signals, comprising
   a center (ZE),
   a plurality of broadband network terminations (BONT), and
   a plurality of subscribers (TN),
   wherein the broadband network terminations (BONT) are connected to the center (ZE) wherein separate groups of subscribers (TN) are connected to each broadband network termination (BONT), wherein television and video signals are transmittable from the center (ZE) to the plurality of subscribers (TN) over downstream channels, and wherein request signals are transmittable from the plurality of subscribers (TN) to the center over a return channel,
   characterized in that
   the return channel is divisible among groups of subscribers (TN) using time-division multiplexing, that the individual subscribers (TN) of a respective group are permitted simultaneous access to a time slot of the return channel assigned to that respective group,
   that simultaneous transmission of request signals by different subscribers (TN) of a group is detectable via a control unit, and
   that said control unit inhibits forwarding of colliding simultaneous request signals.

2. A broadband distribution system (SYS) as claimed in claim 1, characterized in that the control unit (CONTROL) is located at the center (ZE).

3. A broadband distribution system (SYS) as claimed in claim 1, characterized in that the center (ZE) includes a synchronizer (SYNC), that each of the broadband network terminations (BONT) includes a delay device (VE), and that via the synchronizer (SYNC) and the delay devices (VE), the request signals transmitted by the broadband network terminations (BONT) are synchronized with the time-division multiplexed return channel.

4. A broadband distribution system (SYS) as claimed in claim 3, characterized in that delays provided by the delay device (VE) are so adjustable that the request signals transmitted to the center (ZE) are receivable at the center (ZE) in phase.

5. A broadband distribution system (SYS) as claimed in claim 1, characterized in that the part of the return channel assigned to the respective groups is variable in time duration for each respective group.

6. A broadband distribution system (SYS) as claimed in claim 3, characterized in that the delay device (VE) comprises a clock generator (CLK), a shift register (REG), a multiplexer (MUX), and a controller (UNIT).

7. A broadband distribution system (SYS) as claimed in claim 3, characterized in that the delay device (VE) comprises a clock generator (CLK), a counter (COUNT), two comparators (KOMP), and a controller (UNIT).

8. A broadband distribution system (SYS) as claimed in claim 1, characterized in that each broadband network termination (BONT) has a control unit (CONTROL).

9. A broadband distribution system (SYS) as claimed in claim 1, characterized in that if different subscribers (TN) transmit request signals simultaneously, the control unit (CONTROL) transmits a message indicative thereof to all subscribers (TN) connected to the respective broadband network termination (BONT).

10. A method of transmitting request signals from subscribers (TN) to a center (ZE) of a broadband distribution system (SYS) for transmitting television and video signals,
   wherein the request signals are transmitted in a return channel of the broadband distribution system (SYS), and
   wherein the television and video signals are transmitted in a downstream channel of the broadband distribution system (SYS),
   characterized in that
   the return channel is divided among groups of subscribers (TN) using time-division multiplexing, that
   the individual subscribers (TN) of a respective group are permitted simultaneous access to a time slot of the return channel assigned to the respective group,
   that simultaneous transmission of request signals by different subscribers (TN) of a group is detected via a control unit, and
   that said control unit inhibits forwarding of colliding simultaneous request signals.

11. A center (ZE) of a broadband distribution system (SYS) for transmitting television and video signals over a downstream channel to a plurality of subscribers, and for receiving request signals over a return channel, characterized in that
   the center (ZE) has at least one control unit (CONTROL),
   that the return channel to said center is divided among groups of said subscribers by allocating a respective time slot to each group using time-division multiplexing, and
   that each control unit (CONTROL) is able to receive request signals from a group of subscribers (TN) and to detect a transmission of request signals in the same time slot from different subscribers (TN) in a group and is able to inhibit forwarding of colliding request signals in a same time slot.

12. A center (ZE) as claimed in claim 11, characterized in that the center (ZE) additionally comprises a synchronizer (SYNC) for synchronizing said subscriber groups, said synchronizer having
   a clock generator (CLK), and, connected in series,
   a demodulator,
   a phase comparator,
   a controller unit, and
   a modulator coupled to an output of the synchronizer,
   said clock generator having an output connected to inputs of said phase comparator and of said modulator.

* * * * *